United States Patent
Chun et al.

(10) Patent No.: US 12,124,882 B2
(45) Date of Patent: Oct. 22, 2024

(54) METHOD AND APPARATUS FOR LIGHTWEIGHT AND PARALLELIZATION OF ACCELERATOR TASK SCHEDULING

(71) Applicant: Seoul National University R&DB Foundation, Seoul (KR)

(72) Inventors: Byung-Gon Chun, Seoul (KR); Gyeongin Yu, Seoul (KR); Woosuk Kwon, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 459 days.

(21) Appl. No.: 17/524,869

(22) Filed: Nov. 12, 2021

(65) Prior Publication Data

US 2022/0147398 A1  May 12, 2022

(30) Foreign Application Priority Data

Nov. 11, 2020 (KR) .................. 10-2020-0150505
Oct. 5, 2021 (KR) .................. 10-2021-0131872
Nov. 11, 2021 (KR) .................. 10-2021-0154797

(51) Int. Cl.
*G06F 9/46* (2006.01)
*G06F 9/50* (2006.01)
*G06N 20/00* (2019.01)

(52) U.S. Cl.
CPC ........... *G06F 9/5038* (2013.01); *G06N 20/00* (2019.01)

(58) Field of Classification Search
CPC .............................. G06F 9/5038; G06N 20/00
See application file for complete search history.

(56) References Cited

U.S. PATENT DOCUMENTS

| 2016/0162402 | A1 | 6/2016 | Woolley, Jr. et al. | |
| 2019/0391796 | A1* | 12/2019 | Brady | G06F 8/458 |
| 2020/0143206 | A1 | 5/2020 | Kartal et al. | |
| 2021/0374502 | A1* | 12/2021 | Roth | G06N 3/08 |
| 2022/0138019 | A1* | 5/2022 | Abdulaal | G06N 3/045 |
| | | | | 718/104 |

FOREIGN PATENT DOCUMENTS

| KR | 20200069346 A | 6/2020 |
| KR | 20200075185 A | 6/2020 |

OTHER PUBLICATIONS

Chun, Byung-Gon, "Nimble: High-Speed Inference and Training for Static Deep Learning Models," Software Platform Lab, Computer Science and Engineering Department Artificial Intelligence Institute, Seoul National University (25 pages).
Kwon et al., "Nimble: Lightweight and Parallel GPU Task Scheduling for Deep Learning," 34th Conference on Neural Information Processing Systems (NeurIPS 2020), Vancouver Canada, 12 pages).
Kwon et al., Supplemental Materials for Nimble: Lightweight and Parallel GPU Task Scheduling for Deep Learning, 34th Conference on Neural Information Processing Systems (NeurIP 2020) Vancouver, Canada (7 pages).

* cited by examiner

*Primary Examiner* — Gregory A Kessler
(74) *Attorney, Agent, or Firm* — Occhiuti & Rohlicek LLP

(57) ABSTRACT

Disclosed are a method and an electronic apparatus including an accelerator for lightweight and parallel accelerator task scheduling. The method includes pre-running a deep learning model with sample input data having a preset data form and generating a scheduling result through the pre-running.

18 Claims, 8 Drawing Sheets

Algorithm 1: Nimble's stream assignment algorithm.

Input A DAG $G = (V, E)$ where $V = \{v_1, v_2, ..., v_n\}$.
Output A stream assignment $f : V \to S$.

Step 1 Obtain the minimum equivalent graph of $G$. We call this graph $G' = (V, E')$.
Step 2 Define a bipartite graph $B = (V_1, V_2, E_B)$ where $V_1 = \{x_1, x_2, ..., x_n\}$, $V_2 = \{y_1, y_2, ..., y_n\}$, and $E_B = \{(x_i, y_j) \mid (v_i, v_j) \in E'\}$.
Step 3 Find a maximum matching $M$ of the bipartite graph $B$.
Step 4 Make a collection of sets $\{\{v_1\}, \{v_2\}, ..., \{v_n\}\}$. For each $(x_i, y_j) \in M$, combine the two sets that $v_i$ and $v_j$ are in. The result is a partition of $V$.
Step 5 Construct $f : V \to S$ in such a way that $f(v_i) = f(v_j)$ iff $v_i$ and $v_j$ are included in the same set.

FIG. 5B

METHOD AND APPARATUS FOR LIGHTWEIGHT AND PARALLELIZATION OF ACCELERATOR TASK SCHEDULING

CROSS-REFERENCE TO RELATED APPLICATION

This application claims the benefit of Korean Patent Application No. 10-2020-0150505 filed on Nov. 11, 2020, Korean Patent Application No. 10-2021-0131872 filed on Oct. 5, 2021, and Korean Patent Application No. 10-2021-0154797 filed on Nov. 11, 2021, in the Korean Intellectual Property Office, the entire disclosures of which are incorporated herein by reference for all purposes.

BACKGROUND

1. Field of the Invention

One or more example embodiments relate to a method and apparatus for lightweight and parallel accelerator task scheduling.

2. Description of the Related Art

With the development of artificial intelligence (AI) technology, there is an increasing need for specialized hardware dedicated to AI. For example, AI may perform inference and training through predetermined operations. As such, various devices have been developed as designated hardware for implementing and executing AI.

The designated hardware for AI may be implemented by, for example, a central processing unit (CPU), a graphics processing unit (GPU), a field-programmable gate array (FPGA), and an application-specific integrated circuit (ASIC).

SUMMARY

According to an aspect, there is provided a method of lightweight and parallel accelerator task scheduling pre-running a deep learning model with sample input data having a preset data form, and generating a scheduling result through the pre-running.

The method may further include receiving input data, and running a deep learning operators for the input data based on the scheduling result without a separate scheduling for the input data.

The pre-running may include recording an accelerator task running request occurred in the pre-running, and recording an accelerator memory allocation or free request occurred in the pre-running.

The generating of the scheduling result may include generating a trace of accelerator task running request based on the recorded accelerator task running request, and reserving accelerator memory based on the recorded accelerator memory allocation or free request.

The deep learning model may be represented by a graph formed by a node indicating an operator of the deep learning model and an edge indicating a relationship between the operators.

The converting of the deep learning model may include converting the deep learning model into a minimum equivalent graph, generating a bipartite graph for the minimum equivalent graph, determining maximum matching of the bipartite graph, and mapping a node to a stream of the accelerator based on the maximum matching.

The deep learning model may include a static neural network.

According to another aspect, there is provided an apparatus for lightweight and parallel accelerator task scheduling including a processor The processor may pre-run a deep learning model with sample input data having a preset data form, and generate a scheduling result through the pre-running.

The processor may record an accelerator task running request occurred in the pre-running and record an accelerator memory allocation or free request occurred in the pre-running.

The processor may generate a trace of accelerator task running request based on the recorded accelerator task running request, and reserve accelerator memory based on the accelerator memory allocation request or free request.

The deep learning model may be represented by a graph formed by a node indicating an operator of the deep learning model and an edge indicating a relationship between the operators.

The processor may convert the deep learning model into a minimum equivalent graph, generate a bipartite graph for the minimum equivalent graph, determine maximum matching of the bipartite graph, and map a node to a stream of the accelerator based on the maximum matching.

The deep learning model may include a static neural network.

According to another aspect, there is provided an electronic apparatus including a host processor configured to pre-run the converted deep learning model with sample input data having a preset data form and generate a scheduling result through the pre-running, and an accelerator configured to execute the deep learning model based on the scheduling result determined by the host processor.

The host processor may receive input data. The accelerator may run a deep learning operator for the input data based on the scheduling result without a separate scheduling for the input data.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIGS. 5A and 5B are diagrams illustrating an example of an operator-to-stream mapping algorithm according to an example embodiment.

DETAILED DESCRIPTION

Figure 1:
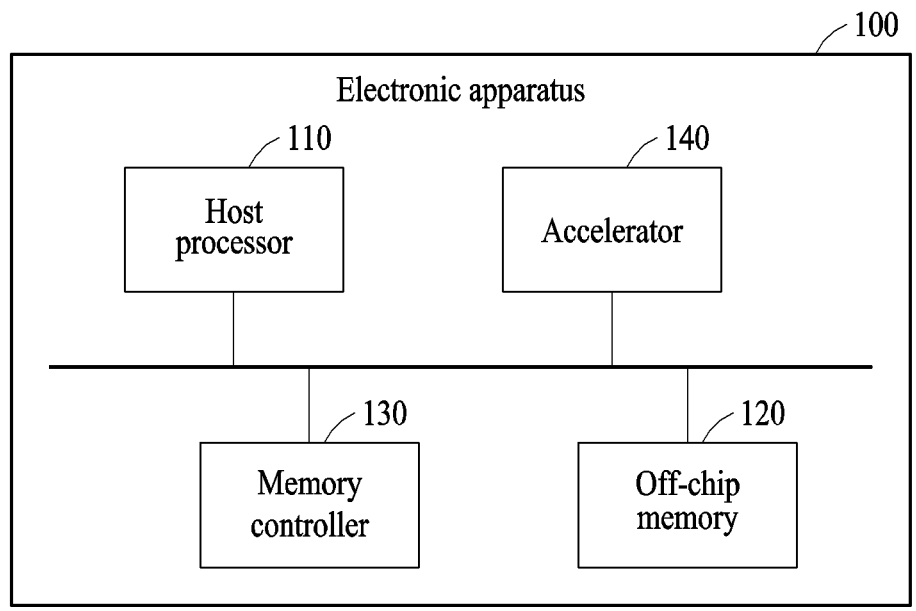
FIG. 1 is a diagram illustrating an example of an electronic apparatus according to an example embodiment.

The following structural or functional descriptions of example embodiments described herein are merely intended for the purpose of describing the example embodiments described herein and may be implemented in various forms. However, it should be understood that these example embodiments are not construed as limited to the illustrated forms.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

When it is mentioned that one component is "connected" or "accessed" to another component, it may be understood that the one component is directly connected or accessed to another component or that still other component is interposed between the two components. In addition, it should be noted that if it is described in the specification that one component is "directly connected" or "directly joined" to another component, still other component may not be present therebetween. Likewise, expressions, for example, "between" and "immediately between" and "adjacent to" and "immediately adjacent to" may also be construed as described in the foregoing.

The terminology used herein is for the purpose of describing particular example embodiments only and is not to be limiting of the example embodiments. As used herein, the singular forms "a," "an," and "the" are intended to include the plural forms as well, unless the context clearly indicates otherwise. As used herein, the term "and/or" includes any one and any combination of any two or more of the associated listed items. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

The following example embodiments may be embodied in various types of products, for example, a personal computer (PC), a laptop computer, a tablet computer, a smart phone, a television (TV), a smart home appliance, an intelligent vehicle, a kiosk, a wearable device, and the like. Hereinafter, examples will be described in detail with reference to the accompanying drawings. When describing the examples with reference to the accompanying drawings, like reference numerals refer to like components and a repeated description related thereto will be omitted.

FIG. 1 is a diagram illustrating an example of an electronic apparatus according to an example embodiment.

Referring to FIG. 1, an electronic device 100 may include a host processor 110, an off-chip memory 120, a memory controller 130, and an accelerator 140. The host processor 110, the off-chip memory 120, the memory controller 130, and the accelerator 140 may communicate with one another through a bus, a network on a chip (NoC), a peripheral component interconnect express (PCIe), and the like.

The host processor 110 may be a device that controls the operations of components included in the electronic device 100 and includes, for example, a central processing unit (CPU). The host processor 110 may receive one or more requests to process a neural network in the accelerator 140 and generate an instruction executable by the accelerator 140 in response to the one or more requests. A request may be for inference based on a neural network and cause the accelerator 140 to execute the neural network to obtain an inference result for object recognition, pattern recognition, computer vision, speech recognition, machine translation, machine interpretation, and the like. The host processor 110 may transmit input data for inference and parameters of the neural network to the accelerator 140. The request may further include a request for training the neural network. In such case, the host processor 110 may transmit input data for training and the parameters of the neural network to the accelerator 140.

The off-chip memory 120 may be disposed outside of the accelerator 140 and be, for example, a dynamic random-access memory (DRAM) utilized as a main memory of the electronic device 100. The off-chip memory 120 may store the input data for inference and/or the parameters of the neural network to be executed in the accelerator 140, and data stored in the off-chip memory 120 may be transmitted to the accelerator 140 for an inference. In addition, the off-chip memory 120 may be used when an on-chip memory in the accelerator 140 is not sufficient to execute the neural network in the accelerator 140.

The off-chip memory 120 may have a greater memory capacity than the on-chip memory in the accelerator 140. However, when the neural network is being executed, the cost to have the accelerator 140 accessing the off-chip memory 120 may be greater than the cost to have the accelerator 140 accessing the internal on-chip memory. A memory access cost may be power and/or time needed to access the corresponding memory and read or write data.

The accelerator 140 may be an artificial intelligence (AI) accelerator that executes the neural network based on an instruction of the host processor 110 and be a separate processor different from the host processor 110. For example, the accelerator 140 may be a neural processing unit (NPU), a graphics processing unit (GPU), a tensor processing unit (TPU), a digital signal processor (DSP), and the like.

The accelerator 140 may process tasks that may be more efficiently processed by a separate specialized processor (i.e., the accelerator 140), rather than by the general-purpose host processor 110, due to the characteristics of the tasks based on the neural network. Here, the on-chip memory and one or more processing elements (PEs) included in the accelerator 140 may be utilized. The on-chip memory may include a global shared buffer and/or a local buffer included in the accelerator 140 and be distinguished from the off-chip memory 120 disposed outside of the accelerator 140. For example, the on-chip memory may include a scratchpad memory accessible through an address space, a static random-access memory (SRAM), and the like.

The neural network may include one or more layers. The neural network may include an input layer, one or more hidden layers, and an output layer. Each of the layers may include one or more nodes, also called artificial neurons. Each node may be a calculation unit having one or more inputs and an output, and the nodes may be connected to each other. A weight may be set for a connection between nodes, and the weight may be adjusted or changed. The weight may amplify, reduce, or maintain a relevant data value, thereby determining a degree of influence of the data value on a final result. Weighted data of each node included in a previous layer may be fed into each node included in the output layer. A process of inputting weighted data from a layer to the next layer is referred to as propagation.

To perform deep learning training and inference in the accelerator 140, an accelerator task scheduling process may need to be run (or performed) prior to requesting the accelerator 140 to perform an accelerator task. Accelerator task scheduling may be a series of procedures necessary to request the accelerator 140 to perform the task. The tasks may include selecting a type of an accelerator task based on the form of input data, allocating a memory of the accelerator for output data and task workspace determined based on the type of the selected accelerator task and the form of input data, preparing function arguments for the accelerator task, and the like.

An existing deep learning system must to repeat the scheduling process described above for all accelerator tasks while running a deep learning job, and thus, the cost of accelerator task scheduling may account for a great portion of the total job execution time. In addition, the existing deep learning system may perform scheduling such that only one of the accelerator tasks is performed at the same time, which is why resources in the accelerator may not be fully utilized.

To be described in detail hereinafter, a method of lightweight and parallel accelerator task scheduling may minimize costs for accelerator task scheduling. The electronic apparatus may perform scheduling for the accelerator tasks included in the deep learning model only once in advance. For subsequent iterations, the scheduling process may be omitted to minimize the scheduling cost. Moreover, the method allows multiple accelerator tasks to be performed all at once, reducing the time taken for running the deep learning model.

Figure 2:
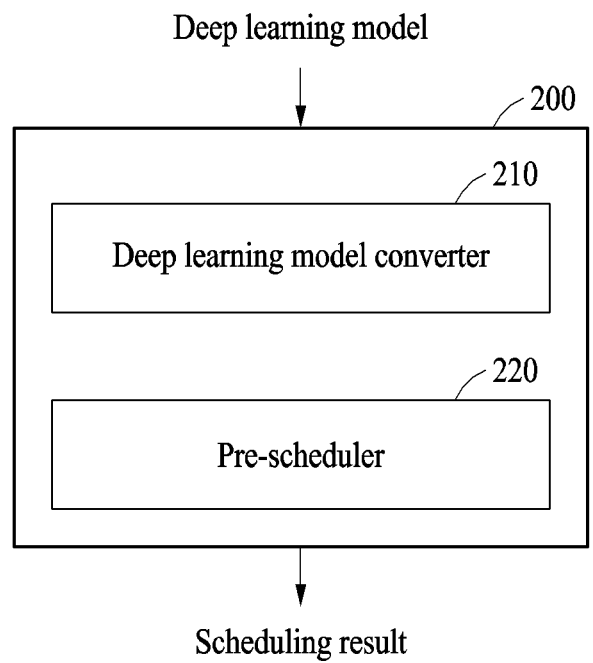
FIG. 2 is a diagram illustrating an example of a host processor according to an example embodiment.

FIG. 2 is a diagram illustrating an example of a host processor according to an example embodiment.

Referring to FIG. 2, a host processor 200 may include a deep learning model converter 210 and a ahead-of-time scheduler 220. Components of the host processor 200 illustrated in FIG. 2 may be separately illustrated to indicate that the components may be separated functionally and logically, which, however, does not indicate that the components are necessarily physically separated elements or are implemented by separate codes.

The host processor 200 may receive a deep learning model. The deep learning model may include a static neural network formed by the same accelerator tasks that do not change as the training or inference procedure is repeatedly performed. That is, the deep learning model may include both a part that is static and a part that is not static. The host processor 200 may generate a scheduling result by applying a method of lightweight and parallel accelerator task scheduling only to the static part among the received deep learning model. To be described in detail hereinafter, the part that is not static may perform an accelerator task based on a conventional method, but the static part with a scheduling result may perform an accelerator task without additional scheduling based on the scheduling result. The deep learning model may branch off to multiple branches based on the input characteristic (i.e., data form), where each branch includes different static neural network. For example, the input may be an image having a data form of 3*200*200 or an image having a data form of 3*250*250. In addition, the input may use a batch size of 1 (data form=1*3*200*200), or a batch size of 4 (data form=4*3*200*200).

The host processor 200 may generate the scheduling result by separately applying the method of lightweight and parallel accelerator task scheduling to the static neural network included in each branch. When a certain static neural network is selected based on the input characteristic at run time, an accelerator task may be performed without an additional scheduling process based on the scheduling result corresponding to the static neural network.

In such a case, scheduling result of the static neural network does not have to be generated for all branches. Instead, the method of lightweight and parallel accelerator task scheduling may be applied only to some frequently used static neural networks (i.e., a scheduling result may be generated in advance and reused). For the remaining static neural networks, an accelerator task may be performed using the conventional method.

For the convenience of description, an example of an accelerator task may be described with an example of a GPU task, but is not limited thereto.

The host processor 200 may convert a user-defined deep learning model using the deep learning model converter 210, perform scheduling once using the ahead-of-time scheduler 220, and transmit the scheduling result to the accelerator. The accelerator may repeatedly perform deep learning training and inference based on the scheduling result provided by the ahead-of-time scheduler 220.

A method of operating the deep learning model converter 210 and the ahead-of-time scheduler 220 is described in detail with reference to FIG. 3.

Figure 3:
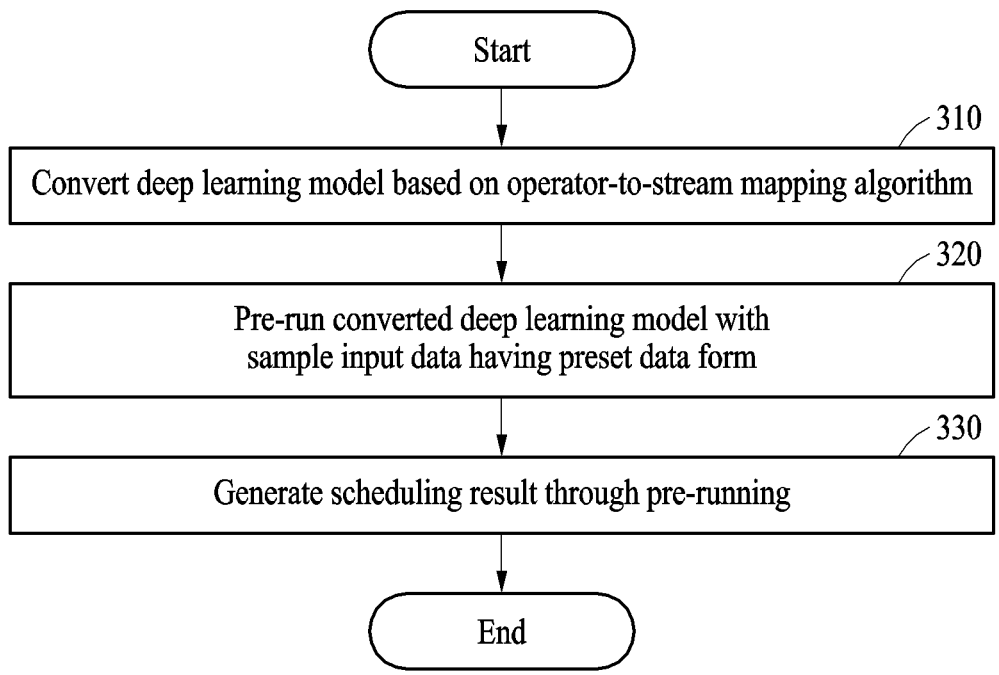
FIG. 3 is a diagram illustrating an example of a method of operating a deep learning model converter and a ahead-of-time scheduler according to an example embodiment.

FIG. 3 is a diagram illustrating an example of a method of operating a deep learning model converter and an ahead-of-time scheduler according to an example embodiment.

Referring to FIG. 3, operations 310 to 330 may be performed by the host processor described with reference to FIGS. 1 and 2. Operations may be performed in the sequence and manner illustrated in FIG. 3. However, the order of some operations may be changed, or some of the operations may be omitted, without departing from the spirit and scope of the illustrative examples described. The operations illustrated in FIG. 3 may be performed in parallel or simultaneously.

In operation 310, the deep learning model converter 210 may convert a deep learning model based on an operator-to-stream mapping algorithm. The deep learning model converter 210 may receive the deep learning model specified by a user as an input. The deep learning model converter 210 may recognize a relationship between GPU tasks forming a given deep learning model and perform the operator-to-stream mapping algorithm that maps each GPU task to a suitable GPU stream.

The deep learning model converter 210 may generate an operator-to-stream mapping. The generated mapping may assign GPU tasks that have no dependence on each other (i.e., can be performed in parallel) to different GPU streams. At the same time, the generated mapping can also minimize the number of synchronizations between GPU streams needed for a correct deep learning execution. An algorithm for generating the operator-to-stream mapping is described below with reference to FIGS. 5A and 5B.

The deep learning model converter 210 may convert the deep learning model using the generated operator-to-stream mapping. The converted deep learning model may also be expressed in a graph form in which each operator corresponds to a node, and data flow between operators corresponds to an edge. The deep learning model converter 210 may insert a routine that assigns a GPU task to a GPU stream mapped by the algorithm described above. The converter 210 may also insert a routine that requests for synchronization between GPU streams to ensure correct deep learning execution.

In operation 310, the ahead-of-time scheduler 220 may pre-run the converted deep learning model with sample input data having a preset data form.

That is, the ahead-of-time scheduler 220 may pre-run deep learning training or inference with input data form desired by the user using the converted deep learning model received as an input. The pre-running may include a GPU task scheduling process, similar to other general deep learning systems.

When the ahead-of-time scheduler 220 pre-runs the deep learning model, once a GPU task running request occurs, the ahead-of-time scheduler 220 may record the request. When a GPU memory allocation/free request is made in the pre-running, the ahead-of-time scheduler 220 may also record the request. An amount of GPU memory needed for the pre-running may be identified based on the recorded GPU memory allocation/free request. Based on this information, the ahead-of-time scheduler may allocate (and reserve) GPU memory required for running the recorded GPU tasks. A scheduling result may refer to the combination of the trace of GPU task running request and reserved GPU memory.

In operation 330, the ahead-of-time scheduler 220 may generate the scheduling result through the pre-running. Since the ahead-of-time scheduler 220 performs the pre-running based on a model converted by the deep learning model converter, the generated scheduling result also employs one or more GPU streams to perform one or more GPU tasks in parallel.

Figure 4:
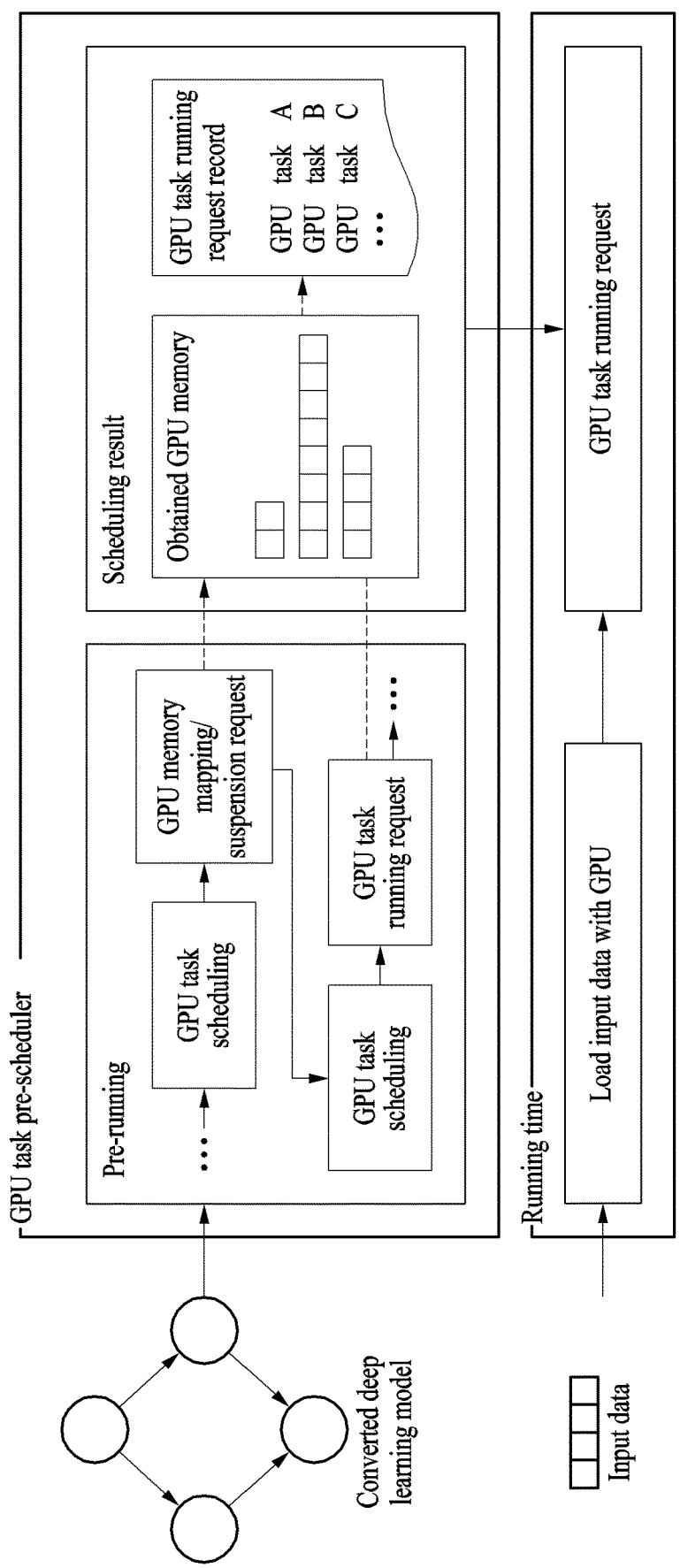
FIG. 4 is a diagram illustrating an example of a method of lightweight and parallel accelerator task scheduling according to an example embodiment.

FIG. 4 is a diagram illustrating an example of a method of lightweight and parallel accelerator task scheduling according to an example embodiment. The description provided with reference to FIGS. 1 through 3 may also be applied to FIG. 4. Thus, a duplicate description of the operations is not included here, for brevity.

Referring to FIG. 4, the ahead-of-time scheduler 220 may pre-run deep learning training or inference with input data form desired by a user using a converted deep learning model received as an input. The pre-running may include GPU task scheduling, GPU memory allocation/free request, GPU task scheduling, and GPU task running request, and such operations may be performed repeatedly.

In addition, when a GPU task running request is made in the pre-running, the ahead-of-time scheduler 220 may record which GPU task is requested, and when a GPU memory allocation/free request is made in the pre-running, the ahead-of-time scheduler may also record the GPU memory allocation/free request.

At run time, an electronic apparatus may receive a scheduling result generated by the ahead-of-time scheduler. The electronic apparatus may further receive input data (e.g., image, voice, text, etc.) that the user intends to use for training or inference.

When performing deep learning training or inference with the received data, the electronic apparatus may directly request a GPU to perform a GPU task using the scheduling result generated by the ahead-of-time scheduler without a separate scheduling process.

That is, the electronic apparatus may perform GPU task scheduling only once in advance. The scheduling result, which is generated in advance, can be reused for subsequent iterations. This allows the electronic apparatus to request a GPU to perform a GPU task without a scheduling overhead.

In addition, GPU tasks that can be run in parallel may be assigned to different GPU streams by analyzing relationships between the GPU tasks, thereby allowing maximum use of GPU resources. The assignment also minimizes the number of synchronizations between GPU streams. By doing so, GPU task running requests may proceed swiftly without being delayed by synchronization between streams. Through such series of effects, it is possible to reduce the execution time of training and inference for a deep learning model.

Figure 5A:
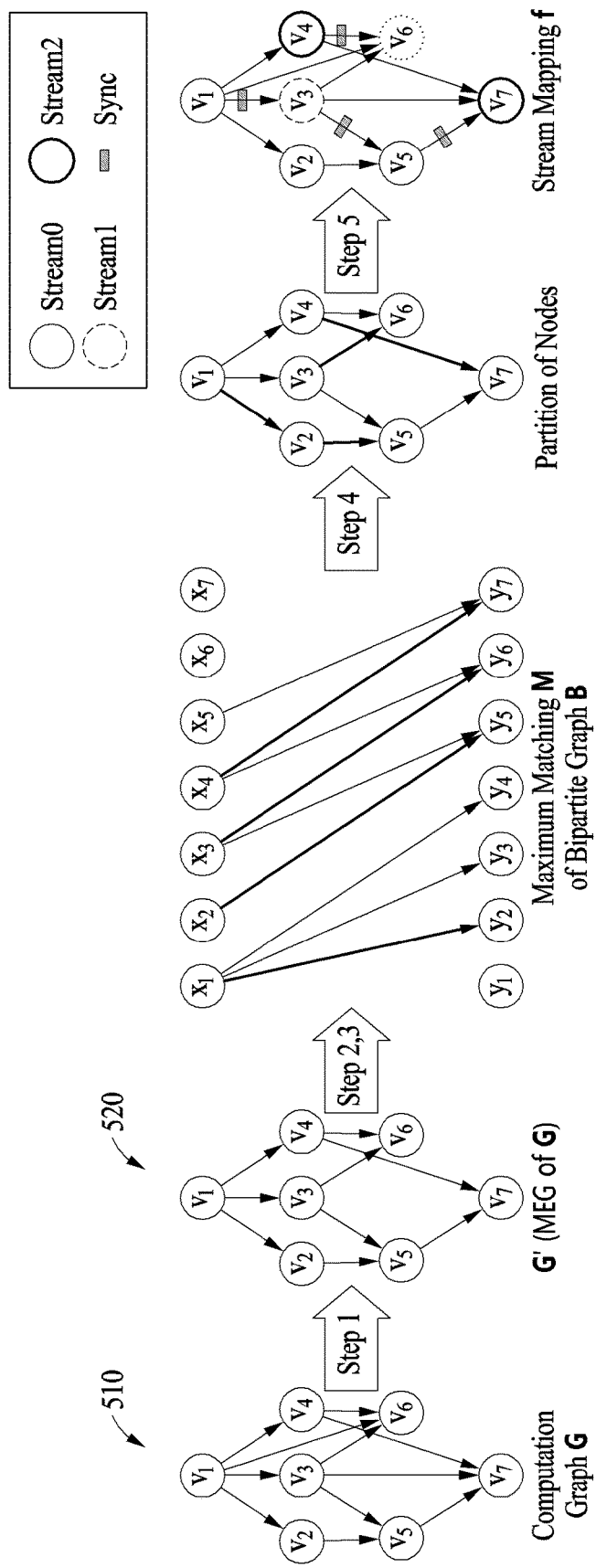

FIGS. 5A and 5B are diagrams illustrating an example of an operator-to-stream mapping algorithm according to an example embodiment.

The deep learning model converter 210 may recognize relationships between the GPU tasks forming a given deep learning model and perform an operator-to-stream mapping algorithm that maps each GPU task to a suitable GPU stream.

Referring to FIG. 5A, the deep learning model may be expressed as a graph formed by nodes indicating operators of the deep learning model and edges indicating relationship between the operators.

The deep learning model converter 210 may convert the deep learning model represented by the graph 510 into a minimum equivalent graph. The minimum equivalent graph 520 indicates a graph corresponding to the greatest subset of the graph 510 and have the same reachability relationship as the graph 510. The minimum equivalence graph 520 is unique and can be constructed in polynomial time.

The deep learning model converter 210 may generate a bipartite graph for the minimum equivalent graph 520. The deep learning model converter 210 may determine maximum matching of the bipartite graph. The deep learning model converter 210 may determine the maximum matching of the bipartite graph based on a Ford-Fulkerson algorithm. However, a method for determining maximum matching of a bipartite graph is not limited thereto.

The deep learning model converter 210 may assign nodes to streams of an accelerator based on the maximum matching. That is, the model converter 210 may generate a collection of node sets in which each node is a separate set. For example, the deep learning model converter 210 may determine $v_1$, $v_2$, and $v_5$ as one node set, $v_3$ and $v_6$ as another node set, and $v_4$ and $v_7$ as yet another node set based on maximum matching. The model converter 210 may assign $v_1$, $v_2$, and $v_5$ to a first stream of the GPU, $v_3$ and $v_6$ to a second stream of the GPU, and $v_4$ and $v_7$ to a third stream of the GPU.

The operator-to-stream mapping algorithm described with reference to FIG. 5A may be expressed as represented in FIG. 5B.

Figure 6:
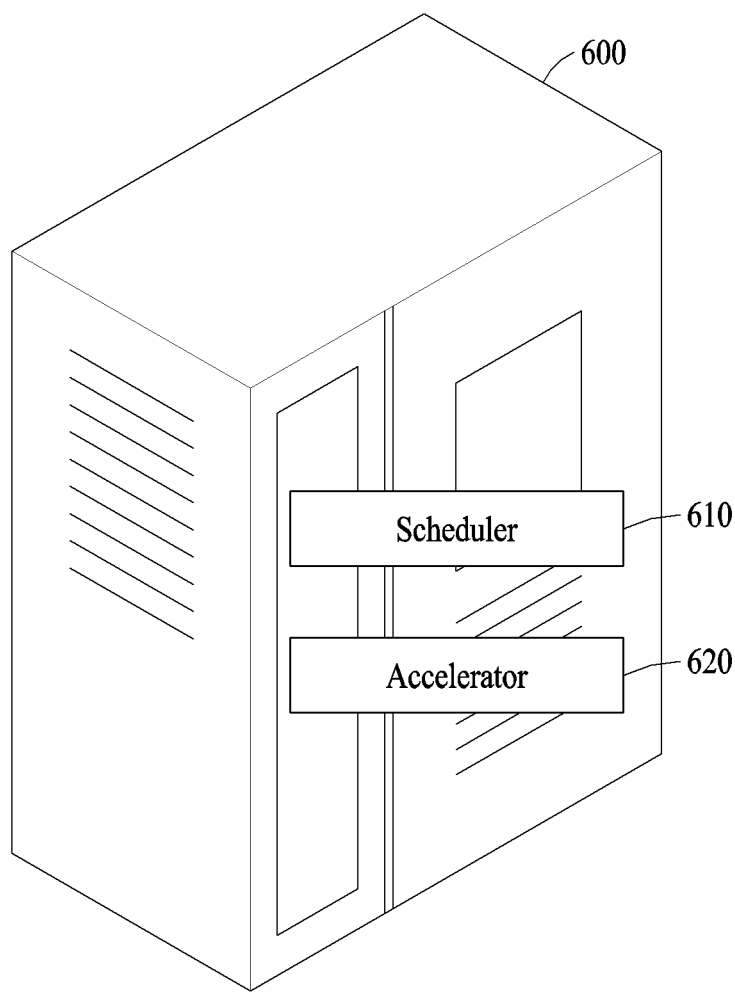
FIGS. 6 and 7 are diagrams illustrating examples of an electronic apparatus according to example embodiments.
Figure 7:
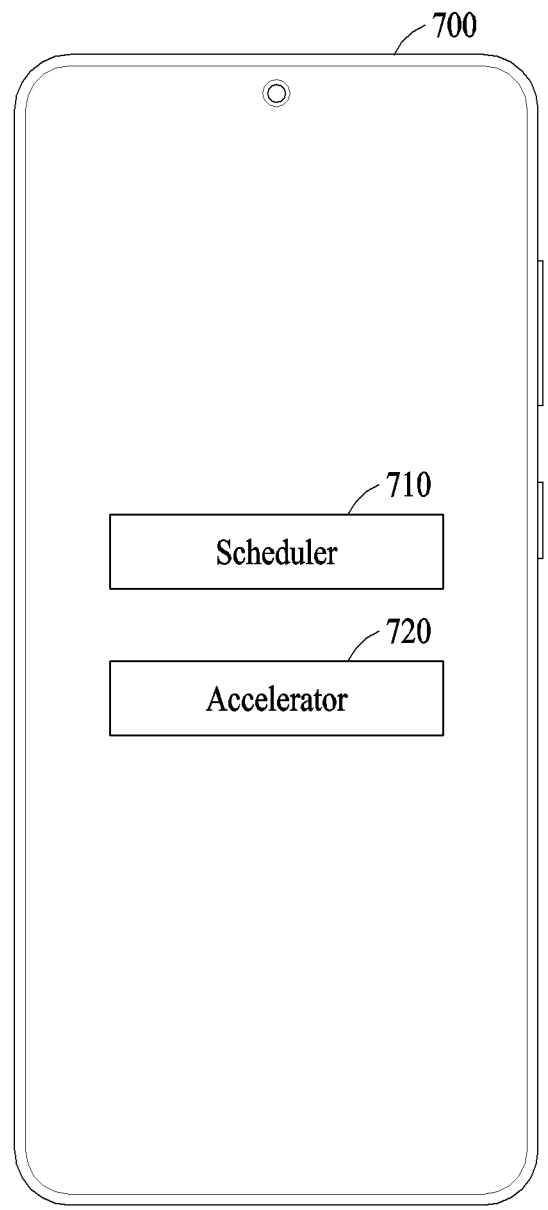

FIGS. 6 and 7 are diagrams illustrating examples of an electronic apparatus according to example embodiments.

Referring to FIG. 6, an electronic apparatus may be implemented as a server 600.

The server 600 may be a separate device distinguished from a user terminal controlled by a user and communicate with one or more user terminals through a wired and/or wireless network. The server 600 may receive requests that are simultaneously transmitted from multiple users through their user terminals.

The accelerator 720 may repeatedly perform deep learning training and inference based on the scheduling result provided by the host processor 710. The server 600 may return inference results to corresponding user terminals. For example, a user terminal may include various computing devices such as a smart phone, a tablet, a laptop, and a personal computer (PC), various wearable devices such as a smart watch and smart glasses, various home appliances such as a smart speaker, a smart TV and a smart refrigerator, a smart car, a smart kiosk, and an Internet of things (IoT) device.

Referring to FIG. 7, an electronic apparatus may be implemented as a user terminal 700. For the convenience of description, an example of the user terminal 700 in the form of a smart phone is illustrated in FIG. 7. However, any device controllable by a user may be the user terminal 700 without limitation. The user terminal 700 may directly obtain requests from a user and transmit a scheduling result to the accelerator 720 through the host processor 710 described above. The accelerator 720 may repeatedly perform deep learning training and inference based on the scheduling result.

The example embodiments described herein may be implemented using hardware components, software components, or a combination thereof. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For the purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described example embodiments may be recorded in non-transitory computer-readable media including program instructions to implement various operations which may be performed by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described example embodiments, or vice versa.

While this disclosure includes example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of lightweight and parallel accelerator task scheduling, the method comprising:
   pre-running a deep learning model with sample input data having a preset data form; and
   generating a scheduling result through the pre-running, wherein the pre-running comprises:
   recording an accelerator task running request occurred in the pre-running.

2. The method of claim 1, further comprising: receiving input data; and
   running a deep learning operator for the input data based on the scheduling result without a separate scheduling for the input data.

3. The method of claim 1, wherein the pre-running comprises:
   recording an accelerator memory allocation or free request occurred in the pre-running.

4. The method of claim 3, wherein the generating of the scheduling result comprises:
   generating a trace of accelerator task running request based on the recorded accelerator task running request; and
   reserving accelerator memory based on the recorded accelerator memory allocation or free request.

5. The method of claim 1, wherein the deep learning model is configured to: be represented by a graph formed by a node indicating an operator of the deep learning model and an edge indicating a relationship between the operators.

6. The method of claim 1, further comprising:
   converting the deep learning model based on an operator-to-stream mapping algorithm.

7. The method of claim 6, wherein the converting of the deep learning model comprises:
   converting the deep learning model into a minimum equivalent graph; generating a bipartite graph for the minimum equivalent graph;
   determining maximum matching of the bipartite graph; and
   mapping a node to a stream of the accelerator based on the maximum matching.

8. The method of claim 1, wherein the deep learning model comprises a static neural network.

9. A non-transitory computer-readable storage medium storing instructions that, when executed by a processor, cause the processor to perform the method of claim 1.

10. An apparatus for lightweight and parallel accelerator task scheduling, the apparatus comprising:
a processor,
wherein the processor is configured to pre-run a deep learning model with sample input data having a preset data form, generate a scheduling result through the pre-running and generate a trace of accelerator task running request based on the recorded accelerator task running request.

11. The apparatus of claim 10, wherein the processor is configured to:
record an accelerator task running request occurred in the pre-running and record an accelerator memory allocation or free request occurred in the pre-running.

12. The apparatus of claim 11, wherein the processor is configured to:
reserve accelerator memory based on the recorded accelerator memory allocation or free request.

13. The apparatus of claim 10, wherein the deep learning model is configured to: be represented by a graph formed by a node indicating an operator of the deep learning model and an edge indicating a relationship between the operators.

14. The apparatus of claim 10, wherein the processor is configured to:
convert the deep learning model based on an operator-to-stream mapping algorithm.

15. The apparatus of claim 14, wherein the processor is configured to:
convert the deep learning model into a minimum equivalent graph, generate a bipartite graph for the minimum equivalent graph, determine maximum matching of the bipartite graph, and map a node to a stream of the accelerator based on the maximum matching.

16. The apparatus of claim 10, wherein the deep learning model comprises a static neural network.

17. An electronic apparatus, comprising:
a host processor configured to pre-run a deep learning model with sample input data having a preset data form, generate a scheduling result through the pre-running and generate a trace of accelerator task running request based on the recorded accelerator task running request; and
an accelerator configured to execute the deep learning model based on a determined schedule from the host processor.

18. The electronic apparatus of claim 17, wherein the host processor is
configured to receive input data,
wherein the accelerator is configured to run a deep learning operator for the input data based on the scheduling result without a separate scheduling for the input data.

* * * * *